Aug. 14, 1956

J. TINDALE 2,758,504

PRODUCTION OF ENGINE-DIVIDED SCALES

Filed May 19, 1953

United States Patent Office 2,758,504
Patented Aug. 14, 1956

2,758,504

PRODUCTION OF ENGINE-DIVIDED SCALES

John Tindale, West Kingsdowne, England, assignor to Elliott Brothers (London) Limited, London, England, a British company Application May 19, 1953, Serial No. 356,024

10 Claims. (Cl. 88—24)

This invention relates to the production of engine-divided scales and is more particularly concerned with accurate scales which are to carry a very large number of closely spaced marks, for example, in the case of a circular scale, marks at each minute of arc of the full circle.

In the production of such scales there is normally a grave risk of errors being introduced due to fatigue of the operator who has to effect each setting of the dividing table in turn preparatory to the production of the corresponding mark on the scale. Moreover, the time required for completing the marking of the scale is very considerable.

The object of the present invention is to provide improved means for the production of finely subdivided accurate scales which shall reduce to a minimum the possibility of error due to the human factor and shall enable the production of such scales automatically in a much shorter time than has hitherto been possible.

According to the invention, means for the production of finely subdivided accurate scales comprises a table for supporting the member on which the scale is to be produced, a normally inoperative mark-producing device fixedly located adjacent to the table, an element operatively connected with the table and carrying a series of marks uniformly spaced apart by a distance which is an integral multiple of that between adjacent marks of the required scale, a second element fixedly located adjacent to the first element and carrying a series of marks which are uniformly spaced apart by the distance between adjacent marks of the required scale and are distributed over a distance equivalent to the spacing between two adjacent marks on the first element, means for continuously displacing the table at a uniform rate simultaneously to traverse the member past the mark-producing device and the first element past the second element, and means adapted to cause the mark-producing device to become operative each time that a mark on the first element moves into coincidence with a mark on the second element.

The marks on the first and second elements may be transparencies and the means for rendering the mark-producing device operative may then include a light source and a light-sensitive device, such as a photo-electric cell. Although the marks to be produced on the member in order to constitute the desired scale, may be fine lines of uniform intensity they may also be patterns composed of areas of differing intensities, for example, opaque and transparent areas. In both cases, the most suitable mark-producing device comprises means for projecting an illuminated image of the mark upon the member supported on the table, this member having its surface rendered photo-sensitive in some known manner. The images to be projected, when other than a line of uniform intensity, may be carried on a photographic film which is adapted to be advanced by one step for each operation of the mark-producing device, this operation including the opening of a shutter (while the film is stationary) to permit the projection of the respective image.

It will be appreciated that the means according to the invention requires the initial production of two graduated scales, that on the first element and that on the second element. These, however, when made with the aid of a dividing engine or the like, may be produced accurately with substantially no risk of errors being introduced due to fatigue of the operator because the production of each scale only requires a relatively small number of settings of the dividing engine or the like. In the specific example of a circular scale which is to carry a mark at each minute of arc, i. e. 21,600 marks, the coarse scale on the first element may have 180 marks spaced from each other by two degrees of arc and the fine scale on the second element would then have 120 marks equally spaced over a two degree interval, that is to say that the total number of settings required will be 300 instead of 21,600.

An example of the way in which the invention may be carried into practical effect will now be described in greater detail with reference to the accompanying drawings, wherein.

The type of scale which it will be assumed is to be produced is a circular scale bearing a mark at each minute of arc, each mark being a narrow radial strip composed of a pattern of dark and light, or opaque and transparent, elemental areas each extending over the full width of the strip.

Figure 1:
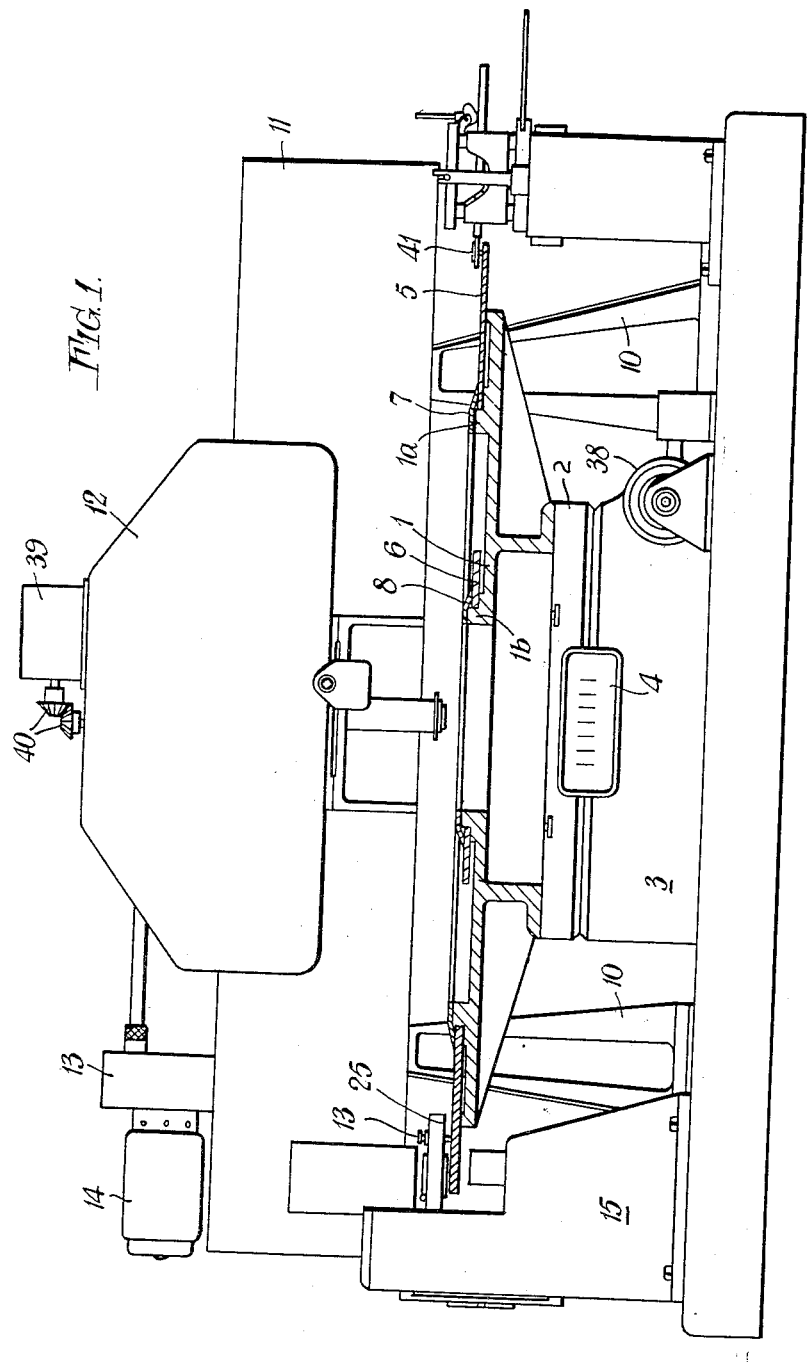
Fig. 1 is a front elevation, partly in section, showing the complete apparatus.

An annular horizontal table 1 (Fig. 1) is mounted for rotation about a vertical axis passing through its centre by being secured upon the rotary dividing table 2 of an accurate dividing engine marked by the general reference 3. 4 is the optical scale of the engine which is normally used in the setting of the table 2 to predetermine angular positions. The annular table 1 is adapted to support at and concentrically with its outer periphery an annular glass sheet 5 of larger external diameter than the table, and, adjacent to and concentrically with its inner periphery, a further annular sheet 6 of smaller external diameter than the table. The sheets 5 and 6 are positioned by annular upstanding ribs 1a and 1b, respectively, formed on the table 1 and are clamped in position by annuli 7 and 8 respectively secured on the ribs 1a and 1b. The sheet 6 carries a photo-sensitive coating upon its exposed face whereas the overhanging marginal portion of the larger sheet 5 is opaque except for fine radial transparent lines 9 (Fig. 3) appearing at intervals of two degrees of arc.

At the rear of the base of the engine 3 are provided standards 10 which support a back-plate 11 and on the front face of the latter is rigidly supported a cinematograph film projector 12 adapted, when the shutter (not illustrated) is opened, to produce upon the marginal portion of the sensitized sheet 6 an illuminated image of what appears on the portion of the film in the gate at that instant. The projecting system includes a fine horizontal slit (not shown) directed radially with respect to the centre of the sensitized sheet and the image is projected on to the plane of the slit with its transverse dimension considerably enlarged, the size of the slit defining the area of the sensitized sheet which is actually illuminated. The film-feeding mechanism and the shutter-operating mechanism are inter-connected and accurately timed in relation to each other, all in a known manner, so that when appropriately actuated from a common driven element, the film will first be fed by a distance corresponding to that between successive images thereon and then the shutter will be rotated to permit projection of the fresh image on to the sensitized sheet. The driven element (see Fig. 1) is one part of a solenoid-operated clutch 13, the other or driving part of which is continuously rotated by means of an electric motor 14.

Figure 2:
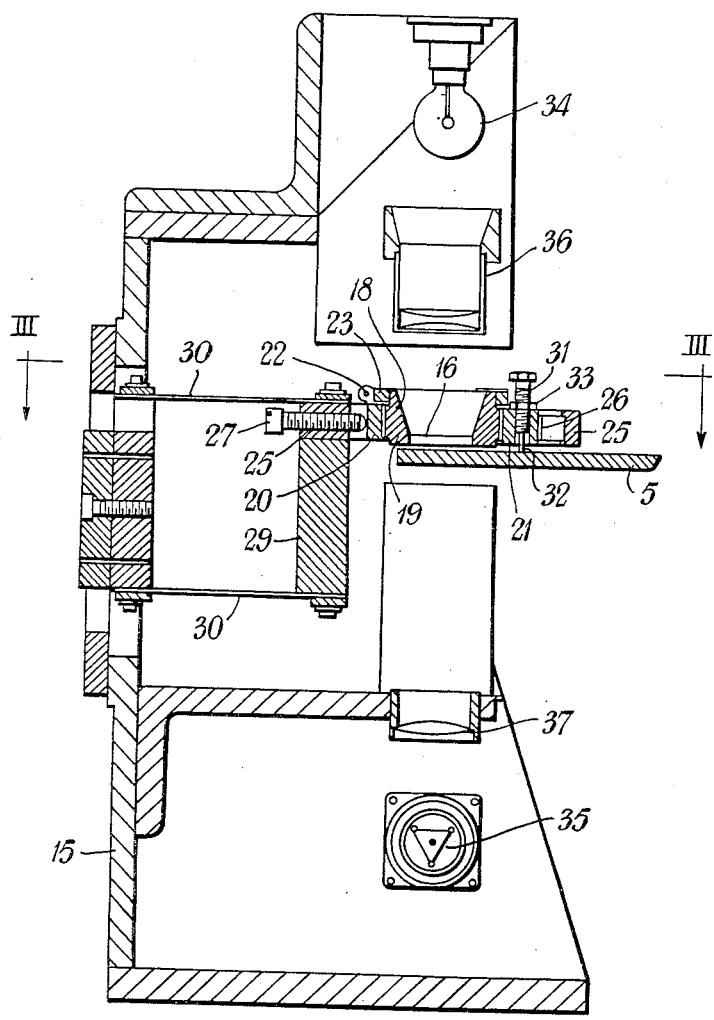
Fig. 2 is a vertical section, to a larger scale, taken on the line II—II of Fig. 3.
Figure 3:
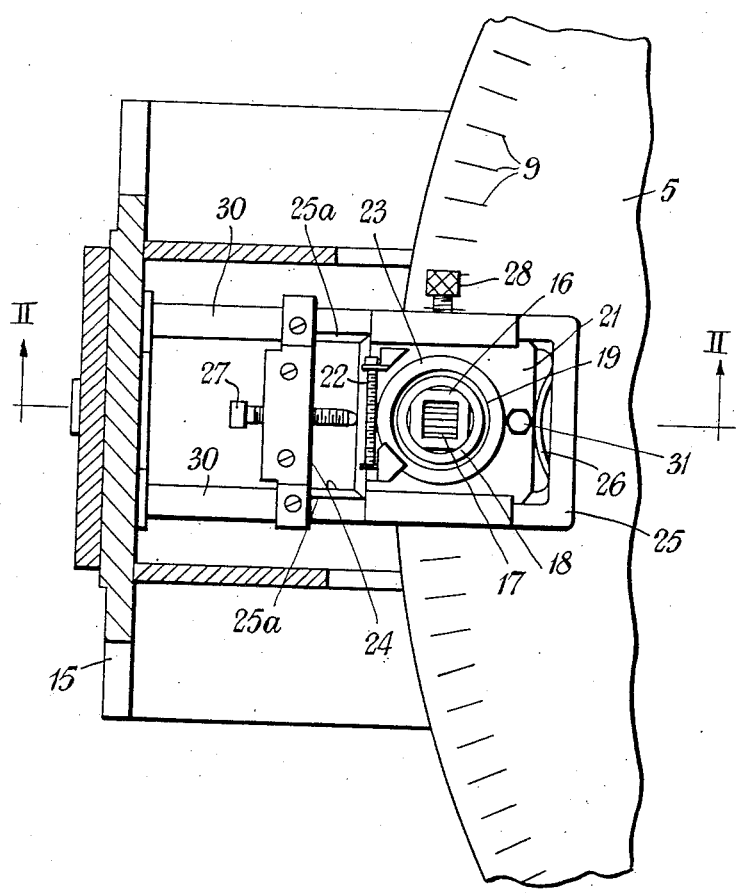
Fig. 3 is a sectional plan view, taken on the line III—III of Fig. 2, of the left-hand portion of the apparatus shown in Fig. 1.

Adjacent to the outer periphery of the sheet 5 supported on the table 1 is rigidly mounted a standard 15 from which projects over the edge of the sheet a horizontal plate or graticule 16 (Figs. 2 and 3) of glass which is generally opaque but carries a series of fine transparent lines 17 (Fig. 3). These lines 17 are arranged to occupy exactly the space between two adjacent lines 9 on the sheet 5 and are disposed radially of the latter at a spacing of one minute of arc, there being 120 of them.

The graticule 16 requires to be located extremely close to the surface of the margin of the sheet 5 and to be positioned with extreme accuracy in relation to the lines 9 thereon. Adjusting and supporting means for enabling these results to be achieved are shown in Figs. 2 and 3. The graticule 16 is secured over the lower end of an opening 18 in a cylindrical carrier 19 which is rotatably adjustable, in an aperture 20 formed through a carriage 21, by means of a screw or worm 22 engaging an annular worm gear 23 secured on the upper end of the carrier 19. The carriage 21 is itself adjustable transversely of the axis of the carrier 19, it being mounted slidably in an opening 24 formed in a rectangular frame 25 having its longer sides directed parallel with that radius of the table 1 which should pass through the centre of the graticule 16 when this is correctly adjusted. These sides carry guides 25a upon which the carriage is slidable, against the action of a bowed leaf spring 26, under the control of an adjusting screw 27 mounted in the outer end of the frame 25. 28 is a clamping screw for fixing the carriage in its adjusted position.

The frame 25 is secured at its inner end upon the upper end of a vertical frame 29 which is supported by upper and lower pairs of horizontally spaced resilient strips 30 extending from the standard 15, the arrangement being such that the frames 25 and 29 may rise or fall slightly while maintaining a position in which the frame 25 is disposed parallel with the surface of the sheet 5. The spacing of the graticule 16 from this surface is determined by the adjustment of a screw 31 threaded in the carriage 21, this screw bearing upon the sheet 5 through the intermediary of a freely rotatable ball 32 mounted in its end and being locked in its adjusted position by means of a nut 33.

On opposite sides of the graticule 16 and the part of the sheet 5 over which it is supported there are arranged a light source 34 and a photo-electric cell 35, respectively, 36 being a suitable condenser and 37 a lens. The light beam passes to the cell 35 through the superposed parts only when a transparent line 9 on the sheet 5 is moved beneath a transparent line 17 on the graticule 16. As will be understood, the amount of light then transmitted will increase from zero to a maximum and then fall to zero again. In order to ensure correct action even though the maxima corresponding to certain coincidences may differ somewhat, the photoelectric cell is adapted to respond when the transmission of light thereto reaches a predetermined intensity which is somewhat less than the lowest maximum likely to be encountered. The output from the photo-electric cell is utilised, after amplification, to energise the solenoid which controls the clutch 13 in the drive to the cinematograph projector 12.

A continuously running high-speed electric motor 38 (Fig. 1) is connected to the table 2 through reducing gearing in order to produce a uniform rotation of the table 1 which is slow in relation to the speed of operation of the shutter of the film projector.

In the operation of the machine, the rotation of the table 1 traverses the marginal portion of the sensitized surface of the sheet 6 beneath the projector 12 while also traversing the marginal portion of the sheet 5 beneath the graticule 16. As the first line on the sheet 5 moves into substantially complete registration with the first line 17 on the graticule, the solenoid-operated clutch 13 momentarily engages the drive to the film-feed and shutter of the projector 12 with the result that the first image on the film is moved into position and is then projected on to the sensitized surface of the sheet 6. It is true that this surface is in motion but its speed is so low that there is no appreciable widening in the circumferential direction of the record produced on this surface by the illuminated image. Immediately after the projection is effected, the solenoid becomes de-energized and the drive is disconnected from the projector, the first line on the sheet 5 having moved on out of register with the first line on the graticule. Each time that the first line 9 on the sheet 5 is brought into substantially complete register with one of the succeeding lines 17 on the graticule, the same operations occur, and as this line 9 is moved beyond the last line 17 the second line 9 on the sheet 5 is brought into register with the first line 17 on the graticule for the sequence to recommence. This goes on until all the lines 9 on the sheet 5 have been traversed past all the lines 17 on the graticule, whereupon the machine is stopped, preferably automatically by means of a counter-operated relay 39 (Fig. 1) which is pre-set to operate immediately the 21,600th exposure has been effected, the counter of this relay being geared, at 40, to the spindle of the shutter of the projector 12. The sheet 6 after developing and fixing of the photographic images thereon by usual methods, may be used to produce further scales by contact printing, as will be understood. It will exhibit an appropriate radially disposed strip pattern at each minute of arc of its marginal portion.

The marks 9 on the sheet 5 may be produced by first applying an opaque coating to one surface thereof, then mounting it upon the table 1 of the machine and manually setting this table to the appropriate positions, a marking element 41 (Fig. 1) being actuated at each position to remove a fine line of the opaque coating from the sheet. The means employed is shown in position at the right-hand side of the machine in Fig. 1 but it will be understood that the marking element 41 is removed to an inoperative position while the machine is in use to produce a scale. The marking element may be accurately set to produce a true radial line, the means for effecting this setting being of any suitable character. As the table is part of an accurate dividing head, the sheet 5 is left in position after the marking thereof and the correct setting up of the graticule carrying the finely spaced lines 17 may be effected with reference to the marks 9 on the sheet 5. The graticule may have the lines 17 produced thereon by any suitable means, including the use of an accurate dividing head and the use of photographic reducing methods, the latter being preferred.

A machine as described may be quickly set up and then started, whereupon it can run without attention, both day and night if need be, until the required number of exposures has been made. It then stops automatically.

The invention is of particular value in the production of a pattern carrier having an area of its surface composed of a number of uniformly distributed elemental strips disposed side by side in the direction of their widths and all of the same length and width, with each strip composed of a row of elemental areas of equal length and each extending over the full width of the strip, each elemental area having one of two different characters so that each strip represents a binary number determined by the pattern in which areas of the one or other character are arranged therein.

Such a pattern carrier is utilised for example in systems of the type described in the specification of co-pending application Serial No. 70,764, dated January 13, 1949, now Patent No. 2,659,072, wherein the elemental areas may be either black (or opaque) or white (or transparent or translucent) and the pattern composed of these areas is scanned by a flying light-spot moving lengthwise of the elemental strips in order to cause the generation of a pulsed electrical output representing the binary member corresponding to the strip which is scanned. The pattern carrier may be of disc form with the patterns applied to an annular area so that each elemental strip extends radially of the disc, the scanning direction also being radial of the disc. In this case, the pulsed electrical output may represent in binary digital form the angular setting of the disc (relative to a fixed scanning location) or some function of this setting. Nevertheless, the pattern carrier may also be of rectangular form with the patterns arranged in parallel lines, either the carrier or the scanning location being displaced as may be desired.

In the production of a pattern carrier of this character with the aid of this invention, the film to be fed through the projector 12 carries markings which may be and usually are photographically produced, which each extend across the width of the strip and represent (by the pattern of black and white areas comprising a marking) a binary number. These black and white areas each occupy an identical proportion of the length of a marking but are wider, that is to say, their dimension in the direction of the length of the film strip is longer, than would be required to cause the image of the marking to occupy an elemental area upon the sensitized surface of the sheet 6, if projected without the interposition of a masking member to a size requisite to cause the total length of the marking to occupy upon the sensitized surface the total length of an elemental area. A masking plate is disposed within the projector 12 having a slit or graticule therein which is so shaped and disposed that it limits the area of the sensitized surface actually illuminated by the image to an elemental area extending radially of the disc and of a length exactly equal to the difference between the inner and outer radii of the annular pattern receiving area. It will be understood that the markings on the film strip may be spaced apart along the length of the latter to any desired degree provided that the spacing is uniform and that the means for feeding the strip through the gate is arranged so that each stepwise advance of the strip will bring one only of the markings into the aperture of the gate. The speed of rotation of the table 1 is such that the annular pattern receiving area of the disc or sheet 6 carried thereon will be advanced through the location at which the image of the film strip is to be projected by a distance exactly corresponding to the width of an elemental area during the interval of time between two successive projections of these images. Consequently, the annular area of the disc or sheet 6 is eventually completely occupied by radially directed contiguous photographic images of the markings on the film. Due to the fact that the width of the markings on the film is greater in proportion to their length than is required in the image thereof actually produced on the sensitized surface of the disc or sheet 6, there is a substantial tolerance in the positioning of the film in readiness for each exposure thereof.

It will be understood that more than one annular area may be provided with patterns in accordance with the invention, for example, there may be 3 concentric annular areas carrying patterns representing in binary digital form the angle, the sine of the angle and the co-sine of the angle respectively. The several functions are dealt with simultaneously at the time the patterns are being produced on the disc, the film employed carrying the appropriate 3 sets of markings. Such a multi-function film may be made from separate single function films by the methods usual in cinematography.

What I claim is:

1. Apparatus for the production of finely subdivided accurate scales on a member comprising a movable table for supporting the member on which the scale is to be produced, a normally inoperative mark-producing device fixedly located adjacent to the path of movement of said table, a first element operatively connected with the table to move with the latter and carrying a series of marks uniformly spaced apart by a distance which is an integral multiple of that between adjacent marks of the required scale, a second element fixedly located adjacent to the path of movement of the first element with said table and carrying a series of marks which are uniformly spaced apart by the distance between adjacent marks of the required scale and which are distributed over a distance equivalent to the spacing between two adjacent marks on the first element, means for continuously displacing the table at a uniform rate simultaneously to traverse the member past said mark-producing device and said first element past said second element, and means causing operation of said normally inoperative mark-producing device each time that a mark on the first element moves into coincidence with a mark on the second element.

2. Apparatus according to claim 1, wherein the marks on the first and second elements are transparencies.

3. Apparatus according to claim 1 wherein said means causing operation of the mark-producing device includes a light source projecting a beam of light at said second element, a light-sensitive device energized by light from said source when a mark on said first element moves into coincidence with a mark on said second element, means for actuating said mark-producing device, and control means interposed between said actuating means and said mark-producing device, said control means responding to energization of said light-sensitive device to then connect said actuating means to said mark-producing means.

4. Apparatus according to claim 1, wherein the marks to be produced on the member in order to constitute the desired scale are patterns composed of areas of differing intensities.

5. Apparatus according to claim 1, wherein the mark-producing device comprises means for projecting an illuminated image of the mark upon the member supported on the table, this member having its surface rendered photo-sensitive.

6. Apparatus for the production of finely subdivided accurate scales comprising a member on which the scale is to be produced a photo-sensitive surface on said member, a movable table supporting said member, a mark, normally inoperative means fixedly located adjacent to the path of movement of said table and operative to project an illuminated image of said mark upon said photo-sensitive surface, a first element carrying a series of transparencies spaced apart by a distance which is an integral multiple of that between adjacent marks of the required scale, said element being operatively connected with said table to move with the latter, a second element fixedly located adjacent the path of movement of said first element with said table and carrying a series of transparencies which are uniformly spaced apart by the distance between adjacent marks of the required scale and are distributed over a distance equivalent to the spacing between two adjacent marks on the first element, means for continuously displacing the table at a uniform rate simultaneously to traverse said member past said image projecting means and said first element past said second element, and means causing operation of said normally inoperative image projecting means each time that a transparency on said first element moves into coincidence with a transparency on said second element.

7. Apparatus for the producton of finely subdivided accurate scales comprising a movable table supporting the member on which the scale is to be produced, a photo-sensitive surface on said member, a photographic film carrying images, normally inoperative means fixedly located adjacent the path of movement of said table and operative to project an illuminated image of said image-carrying film on to said photo-sensitive surface, a shutter interposed between said image projecting means and said surface, means for advancing said photographic film step by step past said image projecting means, a first element carrying a series of transparencies spaced apart by a distance which is an integral multiple of that between adjacent marks of the required scale, said first element being operatively connected with said table to move with the latter, a second element fixedly located adjacent the path of movement of said first element with said table and carrying a series of transparencies which are uniformly spaced apart by the distance between adjacent marks of the required scale and are distributed over a distance equivalent to the spacing between two adjacent marks on the first element, means for continuously displacing the table at a uniform rate simultaneously to traverse said member past said image projecting means and said first element past said second element and means causing opening of said shutter and operation of said normally inoperative image projecting means each time that a transparency on said first element moves into coincidence with a transparency on said second element.

8. Apparatus for the production of finely subdivided accurate patterns composed of areas of different intensities comprising a member on which the patterns are to be produced, a photo-sensitive surface on said member, a movable table supporting said member, a photographic film carrying images of the patterns to be produced, normally inoperative means fixedly located adjacent to the path of movement of said table and operative to project an illuminated image of said film upon said photosensitive surface, a shutter interposed between said image projecting means and said surface, means for advancing said photographic film step by step past said image projecting means, a first element carrying a series of transparencies spaced apart by a distance which is an integral multiple of that between adjacent marks of the required scale, said first element being operatively connected with said table to move with the latter, a second element fixedly located adjacent the path of movement of said first element with said table and carrying a series of transparencies which are uniformly spaced apart by the distance between adjacent marks of the required scale and are distributed over a distance equivalent to the spacing between two adjacent marks on the first element, means for continuously displacing the table at a uniform rate simultaneously to traverse said member past said image projecting means and said first element past said second element and means causing opening of said shutter and operation of said normally inoperative image projecting means each time that a transparency on said first element moves into coincidence with a transparency on said second element.

9. Apparatus as in claim 7; wherein said means causing opening of said shutter and operation of said normally inoperative image projecting means includes a light source projecting a beam of light through the transparencies of said second element, a light-sensitive device energized by light passing through coincident transparencies of said first and second elements, means for driving said shutter and said image projecting means and having a normally disengaged coupling therein, and means engaging said coupling in response to energization of said light-sensitive device.

10. Apparatus for the production of finely subdivided accurate scales comprising a rotary table, an annular member mounted on said table concentric with the latter and on which the scale is to be produced, normally inoperative mark-producing means fixedly mounted adjacent said rotary table at a radial location aligned with said member, a first annular element mounted on said table to rotate with the latter and disposed radially outward with respect to said annular member, said first element carrying a circularly arranged series of transparencies spaced apart by a distance which is an integral multiple of the distance between adjacent marks of the scale to be produced on said member, a second element fixedly mounted adjacent said rotary table and carrying a series of transparencies which are radially located for registration with the transparencies of said first element and which are uniformly spaced apart by the distance between adjacent marks of the scale to be produced and distributed over a distance equivalent to the spacing between adjacent transparencies of said first element, means for continuously rotating said table at a uniform speed simultaneously to traverse said member past said mark-producing means and said first element past said second element, means projecting a beam of light through said transparencies of the second element and against said first element so that the beam of light passes through said first and second elements only when transparencies thereon are coincident, light-sensitive means energized by light passing through coincident transparencies of said first and second elements, and means causing operation of said normally inoperative mark producing means whenever said light-sensitive means is energized.

References Cited in the file of this patent

UNITED STATES PATENTS

| | | |
|---|---|---|
| 2,614,468 | Newcomb | Oct. 21, 1952 |
| 2,667,812 | Miller | Feb. 2, 1954 |